May 11, 1954     F. WRIGHT     2,678,226
TURNBUCKLE
Filed Dec. 27, 1950
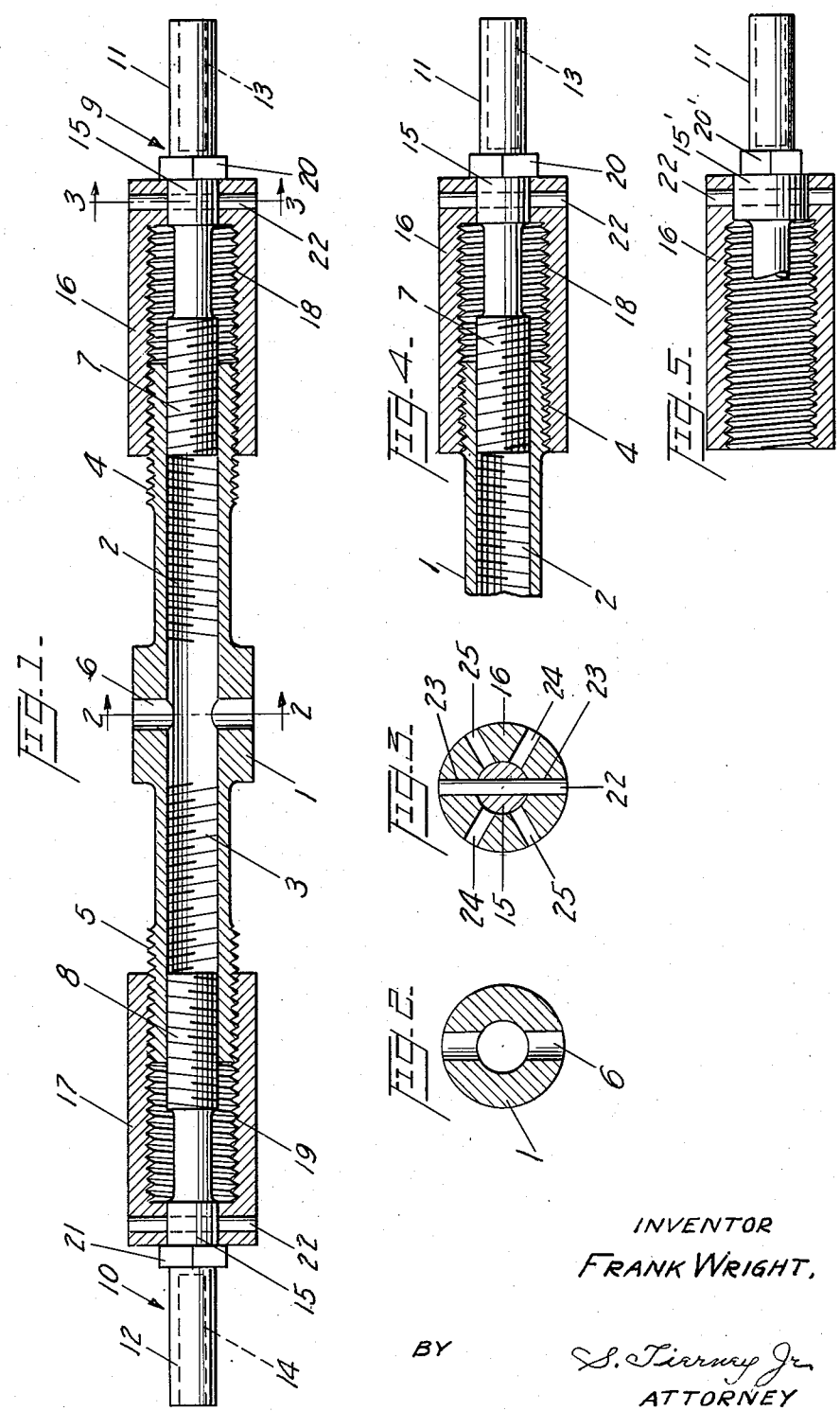
INVENTOR
FRANK WRIGHT,
BY
S. Tierney Jr
ATTORNEY Patented May 11, 1954

2,678,226

UNITED STATES PATENT OFFICE 2,678,226

TURNBUCKLE

Frank Wright, Moreno, Calif.; Ben F. White, administrator of said Frank Wright, deceased Application December 27, 1950, Serial No. 202,924

2 Claims. (Cl. 287—60)

1

This invention relates to turnbuckles and an object is to provide a turnbuckle composed of few parts which are not expensive to manufacture.

Another object is to provide means for easily adjusting the turnbuckle to provide the desired tension in the cable or other member in which it is connected and for locking the turnbuckle in its adjusted position.

Another object is to provide means associated with an adjustable part of the turnbuckle which serves as an indicator to visually indicate to the operator when the adjustment is proper to make the turnbuckle safe so that it will transmit the full-load tension for which it is constructed.

Other objects will become apparent as the description thereof proceeds. For a better understanding of the invention, reference is made to the accompanying drawings, in which:

Fig. 1 is a longitudinal sectional view through the axis of a turnbuckle embodying the invention, Fig. 2 is a transverse section taken through line 2—2 of Fig. 1, Fig. 3 is a transverse section taken through line 3—3 of Fig. 1 and, Fig. 4 is a longitudinal sectional view through one end of a turnbuckle showing a modified form of the invention. Figure 5 is a longitudinal sectional view of one end of a turnbuckle showing another modification of the invention.

Referring to Figs. 1 to 3, the turnbuckle comprises an elongated metal sleeve 1 interiorly threaded at 2, 3 and its ends exteriorly threaded at 4, 5. A cylindrical hole 6 through its center is provided to receive a long pin (not shown), the turning of which causes sleeve 1 to rotate to tighten or loosen the turnbuckle. The interior threads 2, 3 engage the exterior threads 7, 8 formed on the inner ends of driven members 9, 10 whose outer ends 11, 12 have drilled holes 13, 14 adapted to receive the ends of the wire or cable (not shown) whose tension is to be adjusted. Methods of securing the cable to members 9, 10 are well known and need not be described. Members 9, 10 have cylindrical surfaces which serve as journal bearings 15 for a pair of hollow members 16, 17 which have interior threads 18, 19 in threaded engagement with the threads 4, 5. As illustrated in Fig. 1, the threads 7 and 8 are of opposite hand and the threads 4, 5 are of opposite hand to the threads 7, 8 respectively. Driven members 9, 10 are provided with hexagonal flanges 20, 21 adjacent to the bearings 15 to be gripped and held by a wrench when the cable is being tightened. The bearings 15 are drilled to receive a snugly fitting cylindrical locking pin 22 which also passes through aligned holes 23 formed in hollow members 16, 17. Preferably extra sets of holes 24 and 25 (see Fig. 3) are provided in members 16, 17 for their angular adjustment on bearing 15. It will be understood that instead of the pins 22, cotter pins, screws or other known means may be used to lock the turnbuckle.

In using the turnbuckle to tighten a cable whose ends have been secured in the holes 13—14, the locking pins not being in place, hollow members 16—17 are screwed in on threads 4—5 as far as they will go, threads 7, 8 are brought into engagement with the threads 2, 3 respectively and sleeve 1 rotated by means of a pin inserted through hole 6 to draw the driven members 9—10 inwardly until the cable is under the desired tension. In both illustrated forms of the invention, means is provided whereby the operator can determine visually whether a sufficient number of threads 2—7 and 3—8 are in engagement to safely transmit the desired stress. In the arrangement shown in Fig. 1, the length of engagement of threads 2 and 7 is the same as the length of engagement of threads 18 and 4. By knowing the total number of turns of thread 4 and counting the number of turns which are visible beyond the end of member 16, the operator can readily determine the difference which indicates the number of turns of threads 7 and 2 which are engaged together. If a sufficient number of threads are engaged, the operator rotates members 16 and 17 slightly until one of the holes 23, 24 or 25 lines up with the hole in bearing 15 and drives in the pins 22, thus locking the turnbuckle.

Fig. 4 is a longitudinal sectional view of one end of a turnbuckle similar to that illustrated in Figs. 1 to 3 except as to the lengths of certain parts. In this embodiment of the invention, the members 16 and the threads 18 thereon extend beyond the end of threads 7 by such an extent that when the operator has rotated sleeve 1 until thread 4 is fully covered by thread 18 and no part of thread 4 is visible, a sufficient length of threads 2 and 7 is in engagement to transmit the full stress that the turnbuckle is intended to carry. The corresponding parts at the other end of the turnbuckle are similarly arranged. When used in an airplane installation having several turnbuckles, this arrangement provides for an easy and rapid inspection, the inspector merely having to look for the threads 4 and if he finds them fully covered, he knows that the turnbuckles are adjusted so as to be capable of carrying their full loads.

Fig. 5 shows a further modification in which the hexagonal nut 20' is smaller than bearing 15' so that member 16 may be slid outwardly prior to the engagement of threads 2—7 in the assembly. After the cable is sufficiently tight by rotation of sleeve 1, member 16 is slid inwardly and screwed into position along thread 4. This construction facilitates inspection in that an inspector may remove pin 22, screw member 16 off thread 4 and slide it out, thus permitting the visual inspection of thread 7 as to sufficiency of engagement with thread 2.

Having described its construction, this application is intended to cover all changes and modifications of the examples of the invention herein chosen for purposes of the disclosure, which do not constitute departures from the spirit and scope of the invention.

I claim:

1. A turnbuckle comprising a sleeve having its ends internally threaded in opposite directions and externally threaded in opposite directions, the internal thread at each end being of opposite hand to the surrounding external thread; a pair of driven members having threaded portions at their inner ends and recesses adapted to receive the ends of a cable to be tightened at their outer ends, said driven members having cylindrical bearings located between said threaded portions and recesses and said threaded portions having threaded engagement with the interior threads of the sleeve to be simultaneously drawn together upon rotation of the sleeve; a pair of hollow locking members having their outer ends journaled for rotation on said cylindrical bearings and having interior threads in threaded engagement with the external threads of said sleeve; and means engaging the outer ends of said locking members for preventing rotation thereof on said driven members, each of said driven members having, beyond the outer end of its locking member a plurality of flat faces extending substantially parallel to the axis of the driven member and adapted to be grasped with a wrench to prevent rotation of the driven member in response to the rotation of said sleeve to adjust the turnbuckle.

2. A turnbuckle as claimed in claim 1; in which the distance across said flat faces is less than the diameter of said cylindrical bearings whereby the outer ends of said locking members will clear said flat faces when the locking members are screwed into locking position.

References Cited in the file of this patent

UNITED STATES PATENTS

| Number | Name | Date |
|---|---|---|
| 647,988 | Rozansky | Apr. 24, 1900 |
| 1,016,835 | Maurice | Feb. 6, 1912 |
| 1,110,201 | Hardick | Sept. 8, 1914 |
| 1,265,104 | Ogden | May 7, 1918 |
| 1,480,253 | Fisher | Jan. 8, 1924 |
| 2,295,357 | Ryan | Sept. 8, 1942 |
| 2,365,433 | Polizzi | Dec. 19, 1944 |
| 2,479,096 | Bratz | Aug. 16, 1949 |

FOREIGN PATENTS

| Number | Country | Date |
|---|---|---|
| 746,020 | France | of 1933 |